Oct. 13, 1970    J. MARCOVITCH    3,533,259
PROFILING OF WORKPIECES
Filed Feb. 13, 1967    13 Sheets-Sheet 2
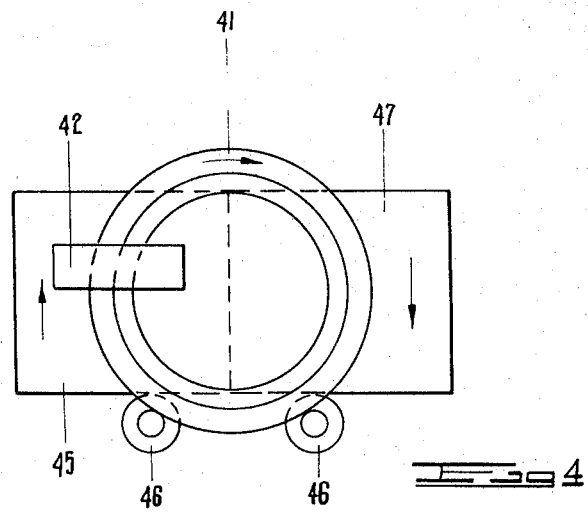
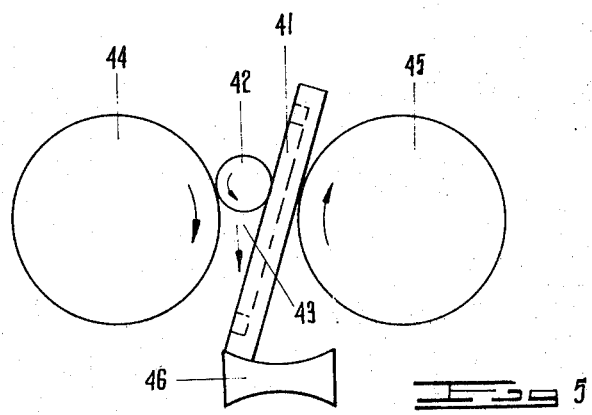
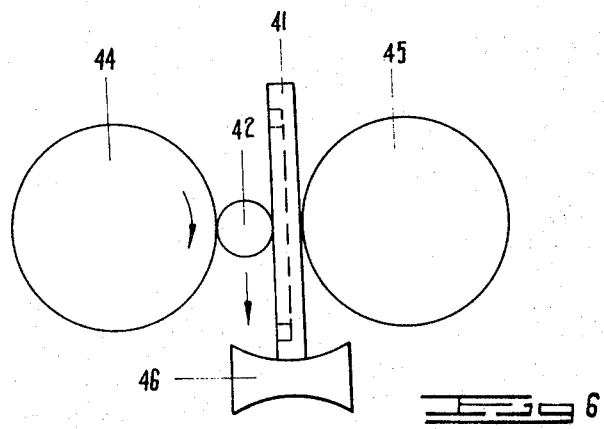
INVENTOR
JACOB MARCOVITCH
By Young & Thompson
ATTYS.

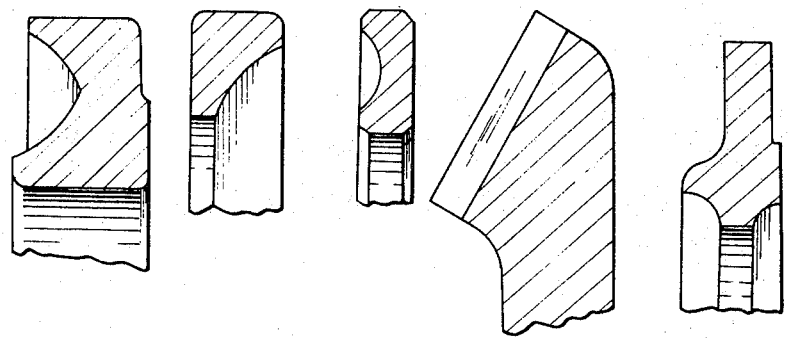
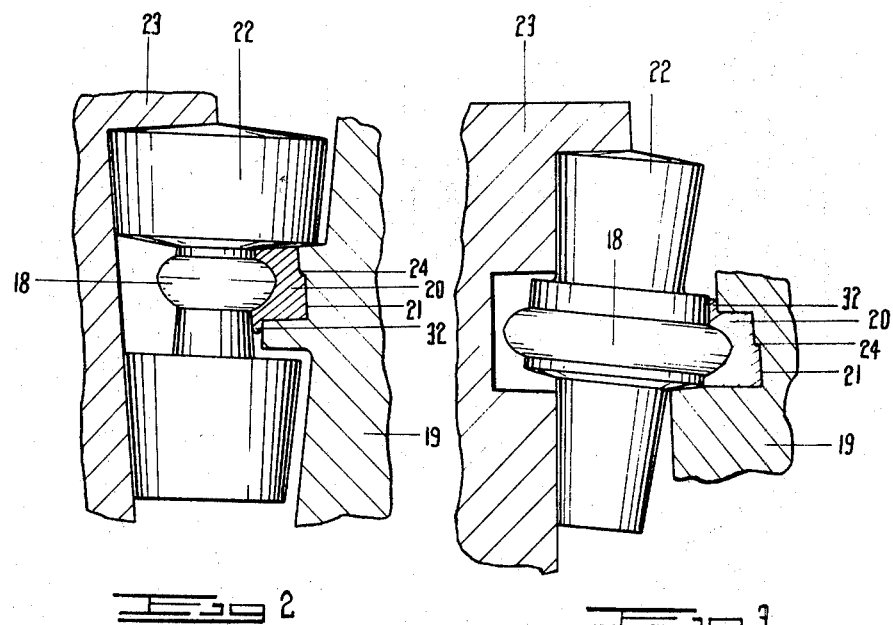

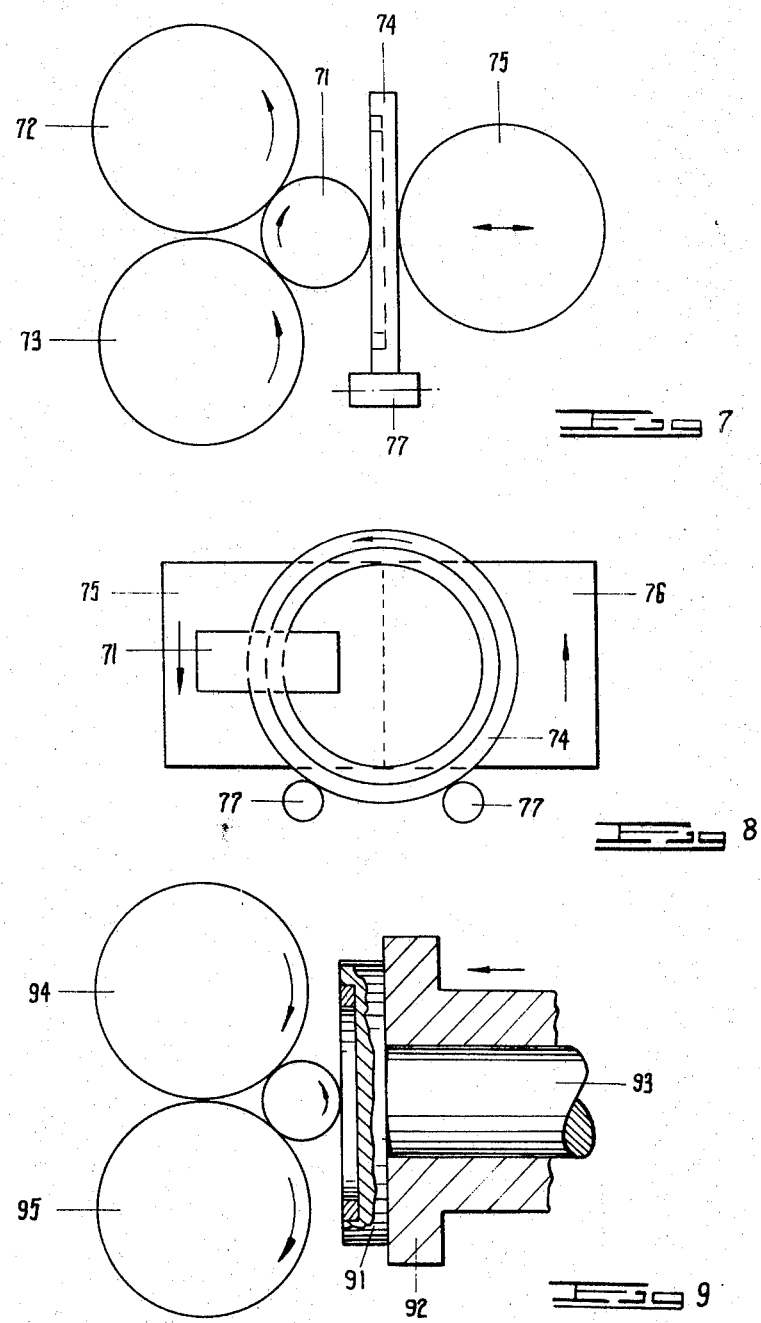

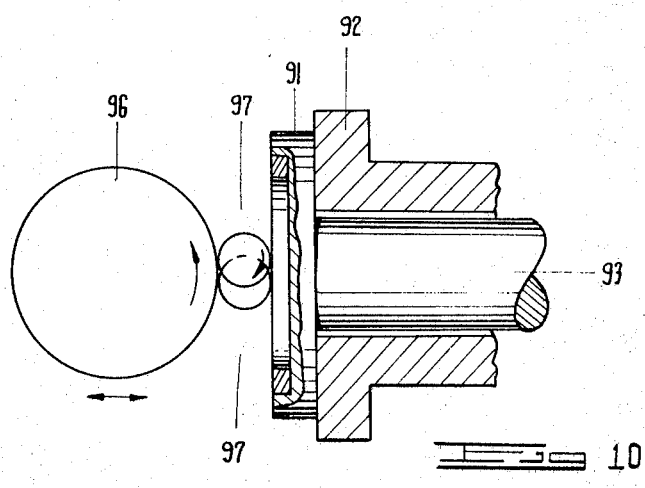
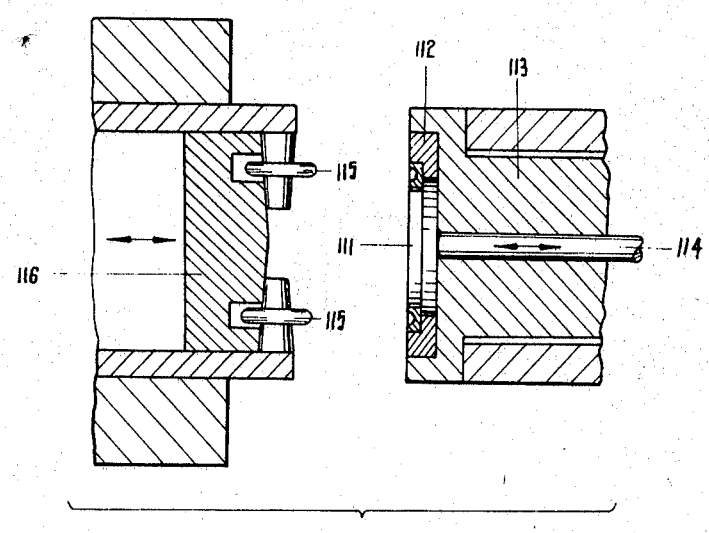

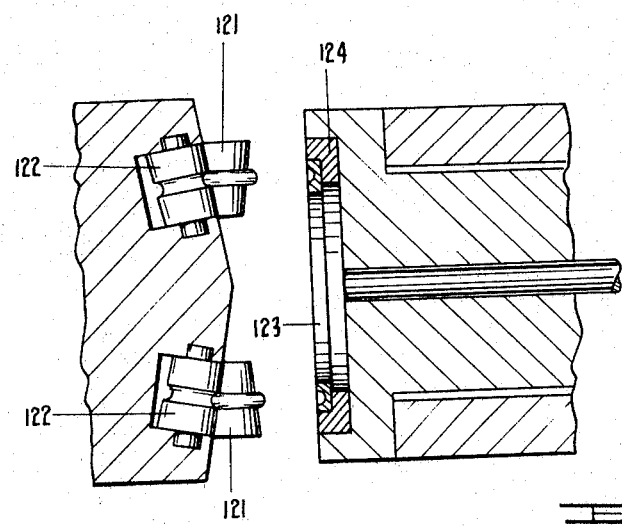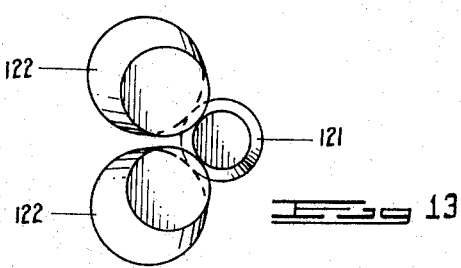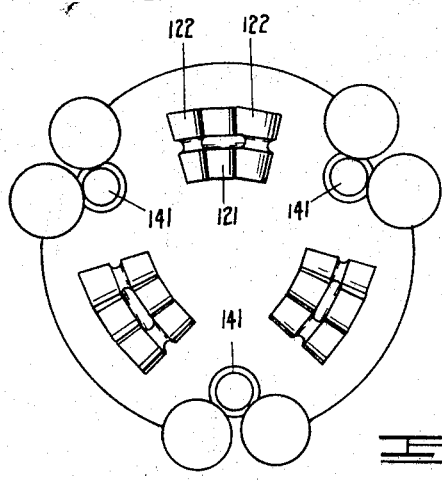

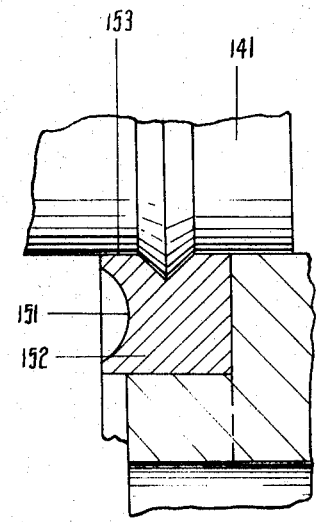
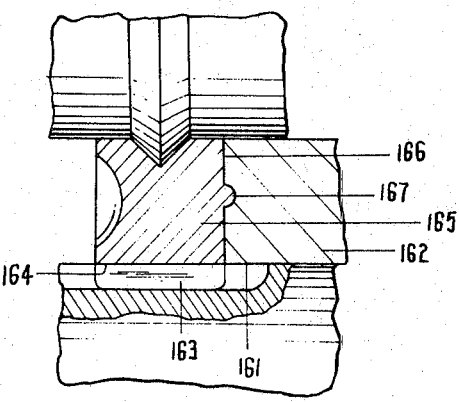
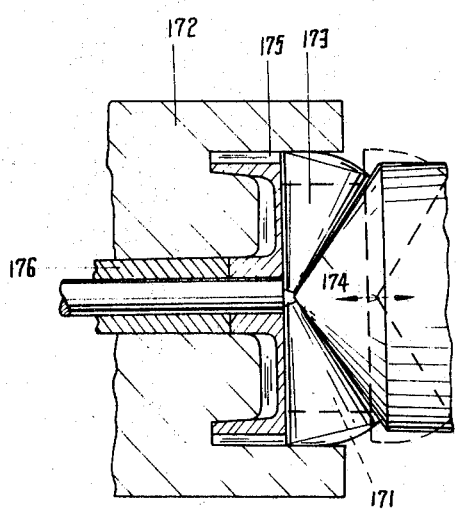
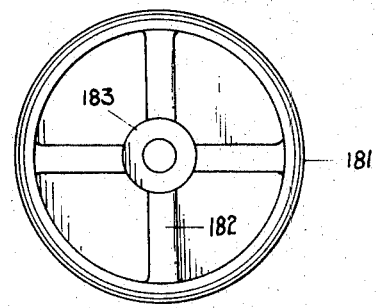

Oct. 13, 1970  J. MARCOVITCH  3,533,259
PROFILING OF WORKPIECES
Filed Feb. 13, 1967  13 Sheets-Sheet 8
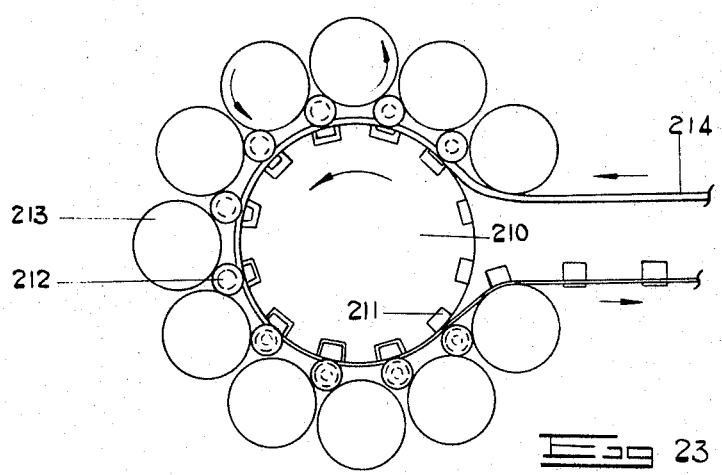
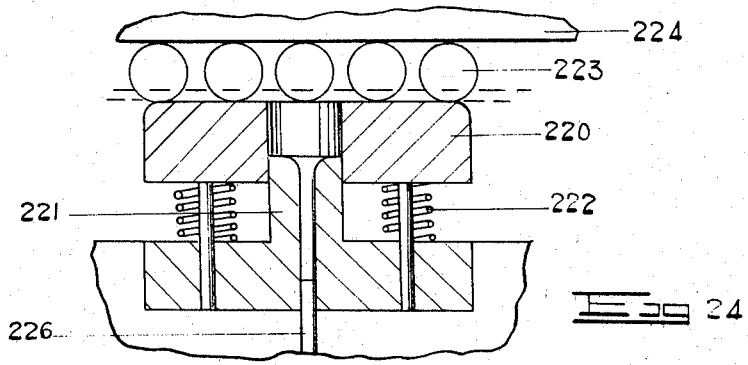
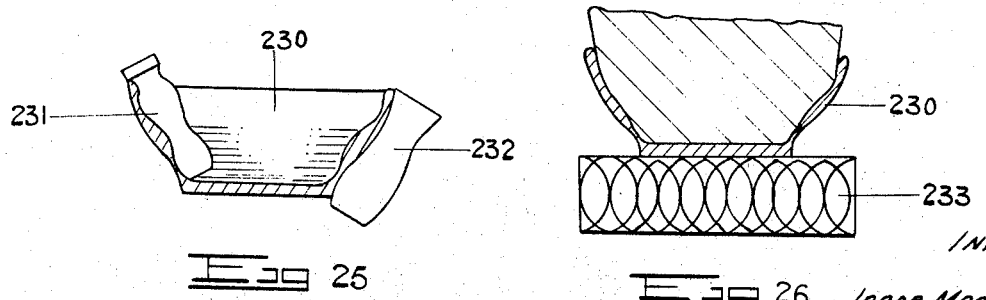
INVENTOR
JACOB MARCOVITCH
By Young & Thompson
Attys.

Oct. 13, 1970  J. MARCOVITCH  3,533,259
PROFILING OF WORKPIECES
Filed Feb. 13, 1967  13 Sheets-Sheet 10
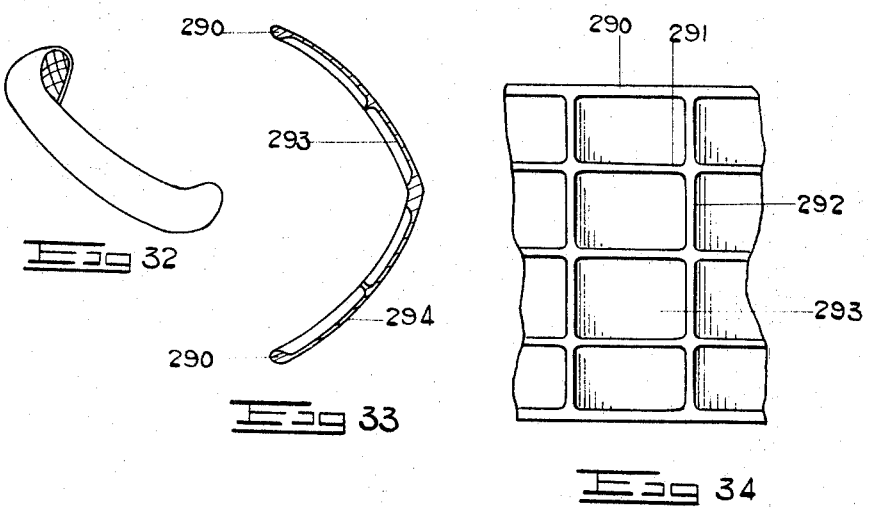
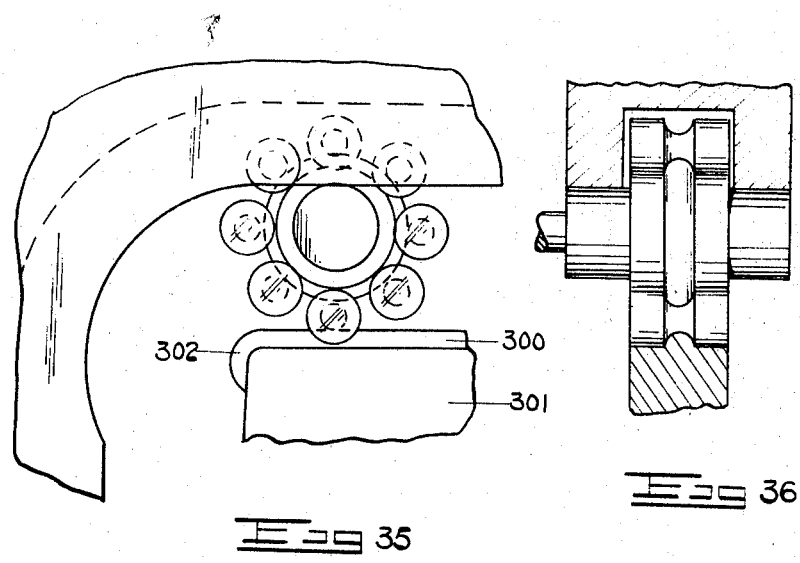
INVENTOR
JACOB MARCOVITCH
BY Young + Thompson
ATTYS.

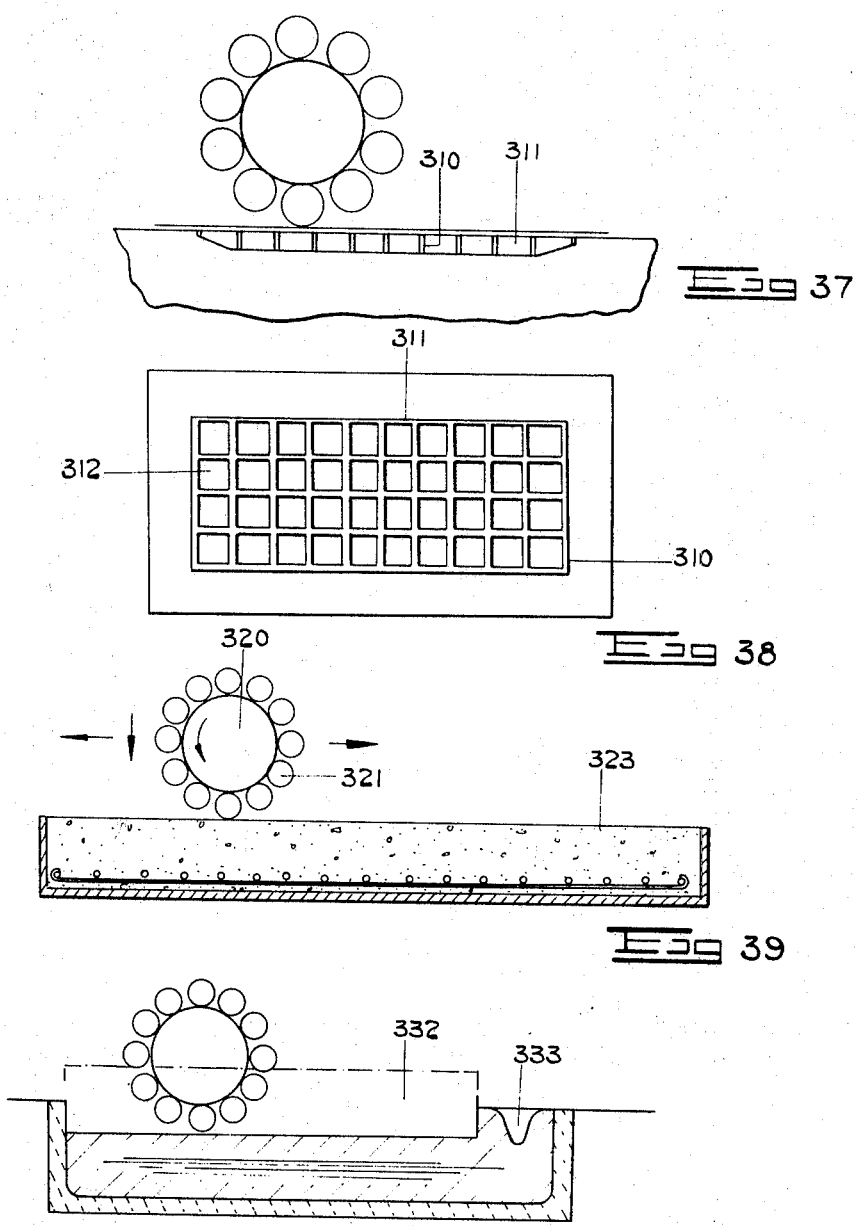

Oct. 13, 1970 J. MARCOVITCH 3,533,259
PROFILING OF WORKPIECES
Filed Feb. 13, 1967 13 Sheets-Sheet 12

INVENTOR
JACOB MARCOVITCH
BY Young + Thompson
ATTYS

United States Patent Office 3,533,259
Patented Oct. 13, 1970

3,533,259
PROFILING OF WORKPIECES
Jacob Marcovitch, Johannesburg, Republic of South Africa, assignor to Rotary Profile Anstalt, Vaduz, Liechtenstein
Filed Feb. 13, 1967, Ser. No. 615,613
Claims priority, application Republic of South Africa, Feb. 14, 1966, 66/804
Int. Cl. B21h 1/06
U.S. Cl. 72—110         1 Claim

ABSTRACT OF THE DISCLOSURE

Workpieces of materials highly resistant to deformation or compaction but capable of plastic deformation under high pressure are subjected to transient, very high pressure applied to elements of the workpiece progressively, until the whole workpiece has been traversed. The pressure may be applied by a patterned formation which imposes its profile on the workpiece, or the workpiece may be kneaded into intimate contact with the pattern to receive its impress.

---

This invention relates to the shaping of articles from materials which are, in the mass, highly resistant to deformation but which are nevertheless capable of plastic deformation if enough force is used; and which, when so deformed, remain so or nearly so. Materials of this kind include metals such as steel, copper and aluminium, and non-metallic materials such as aggregates of crushed stone and sand, for making concrete, and some bodies of discrete particles or granules, for instance of plastic.

The shaping may involve compaction of a body of the material into a mould, to compress it, without plastic flow, for instance the densification of concrete by vibration or tamping; or it may involve plastic flow such as occurs in forging or extrusion techniques.

However, as the invention will find its major applications in the shaping of metallic articles, it will therefore be dealt with herein with particular emphasis on the manufacture of metallic products.

Forging of machine components has obvious advantages over other processes, such as machining or casting. Machining is slow, requires skilled operators which are more and more difficult to come by, and is expensive as regards material, since there is inevitably a high proportion of waste. Casting means that moulds have to be made, furnaces provided for melting the metal, and the end product lacks the strength of machined or forged components.

Unfortunately, forging is not itself without disadvantages. Initial machine cost is high, running costs apt to be expensive, and dies are subjected to very severe conditions and must often be repaired or replaced. Cold forging limits the utility of the process greatly and hot forging, while permitting the production of many articles which cannot be forged in the cold, introduces complications and additional cost, especially where further machining is required.

The object of this invention is to propose techniques which are applicable to the production of many articles which are presently made by non-forging methods because of the limitations of forging procedures presently available and to produce new articles.

According to the invention, the method consists, broadly, in traversing the surface of the material by a procession of small rollers, each in turn brought to bear on an element of the surface to apply to the element a transient high-intensity pressure, and continuing so to traverse the area until it has been blanketed.

Insofar as deformation of the area is concerned, the method consists, further according to the invention, in juxtaposing a pattern of the article to be produced to a blank, and kneading the blank into intimate contact with the pattern by rolling pressure applied progressively in a prescribed locus, and continued until the blank is brought into conformity with the pattern; and withdrawing the formed article from the pattern. It is not excluded that the blank be hot when it is pressed against the pattern, but usually the operation can and would be performed in the cold. The locus would usually be circular.

It is also not excluded that the blank be selectively heated in certain zones such as the zone adjacent the pattern.

In a development the kneading means is itself a pattern, so that it imposes the complement of its own shape on the blank; which may be in addition to the configuration kneaded into the opposite face of the blank.

It is evident that there is a fundamental difference between the process of the invention and the conventional forging process. In forging articles, the forging pressure is applied to the blank as a whole, whereas, in the technique of the invention, the pressure is steadily applied but to different elements of the blank progressively, and is continued until the product has been produced. Thus, deformation or compaction of a mass of material that is resistant to flow, is carried out to a greater degree, more effectively, and applied to a wider field than heretofore, by the application of localised high intensity pressure progressively to achieve the desired results.

Techniques of profiling the outer and inner faces of annular workpieces by rolling have been explored, at least theoretically. By these techniques, or at least by such of them as are practical, many components, such, for instance, as the outer and inner races of normal rolling bearings, can be manufactured competitively with machined races. Essentially, however, the techniques are confined to circumferential faces. The present invention enables annular components to be profiled at their sides, and, in combination with the techniques known for profiling the inner or outer faces of an annular workpiece, or proposed by this invention, it becomes possible in a single operation to profile workpieces on three or even four faces. How the techniques are combined will be considered later in this specification.

The invention will be further discussed with reference to the accompanying drawings, in which:

FIG. 1 shows, in fragmentary sectional view, a number of commercial articles suitable to be made by the techniques of the invention;

FIG. 2 is a view, mostly in section, of part of a machine to make an article illustrated in FIG. 1;

FIG. 3 is a similar view of part of a machine to make the article shown in the first position in FIG. 1;

FIG. 4 is an end view of the machine of FIG. 5,

FIG. 5 is a diagrammatic side view of a machine to profile an annular workpiece on one side, at the commencement of the operation;

FIG. 6 is the same as FIG. 5, but with the workpiece fully profiled,

Figure 19:
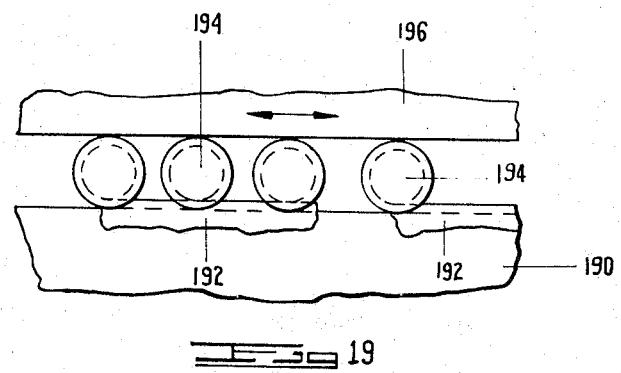

FIG. 7 is a diagrammatic side view of a modification of a machine, with the mandrel supported by two rollers, FIG. 8 is an end view of the machine of FIG. 7, employing one mandrel, FIGS. 9 and 10 are fragmentary side views, partly in section, of machines for profiling an annular workpiece, where the maximum number of formers used is two, showing double and single line contact for the formers respectively, no tilting of the member 74, which is driven by plain rollers 77.

It will be understood that, although in the drawings only one former 42 or 71 is shown, there can in fact be two, spaced diametrally apart.

In the embodiment of FIGS. 9 and 10, the member 91 is held in or is part of a backing 92. The backing or the member is rotated by a shaft 93. Again, two formers are the maximum that can be used.

In FIG. 9, the former or each former rotates about a fixed axis and is backed by two rollers 94, 95 for the former or each former. The backing is forced towards the former or formers as the member 91 rotates, to knead the workpiece. In FIG. 10, a roller 96 or a pair of rollers if there are two formers, defines a throat 97 with the member 91 through which the or each former passes. It will be observed that the throats for each former converge in opposite directions to each other.

In FIG. 11, a workpiece 111, to be kneaded into the member 112 held in a backing member 113 is kneaded by a series of formers 115 held in a holder 116 which is urged towards the workpiece 111. The formers are arranged in a circle, so that each follows up its predecessor in the same locus.

The workpiece may be rotated or may be stationary.

A pusher 114 may be provided to extract the workpiece from the member 112.

FIGS. 12 and 13 show an arrangement akin to that of FIG. 11, except that the formers 121 do not roll on the holder, but each rolls on a pair of rollers 122 (see FIG. 13) which are frusto-conical. The formers are themselves frusto-conical so that they are lined up with the workpiece 123 held in the member 124.

In FIG. 14 formers 141 are added to the arrangement of FIGS. 12 and 13 to profile the outer circumferential face of the workpiece. This is seen happening in FIG. 15, where the face 151 of the workpiece 152 is profiled by the formers 121 and the circumferential face 153 by the formers 141. A logical extension is shown in FIG. 16, in which the face 161 of the member 162 is profiled, as with gear teeth 163, to impose its form on the inner face 164 of the workpiece 165. Since the face 166 of the member 162 can also be profiled, as shown at 167, the workpiece can be profiled on all four faces, simultaneously. The formers 141 impress their shape by virute of the indirect displacement of the metal from face 151. They may, however, be moved independently inwardly to cooperate simultaneously with the other formers. If the profile they impose is re-entrant they must, however, be displaced to allow ejection of the component. Any of the formers may be carried in bearings and not necessarily roll in line contact with a face nor with other back-up rollers.

In FIG. 17, a component such as the wheel shown in FIG. 18, with a toothed rim 181 and spokes 182 radiating from a hub 183, may be kneaded, integral with a web joining them all. A rough annular or solid blank 171 shown dotted in FIG. 17, is kneaded into the cavity of a die 172 by a series of formers 173 that are rotated in contact with a rotating nose 174 of conical shape complemental to the taper of the formers. The cavity of the die has teeth forms 175 in its peripheral surface which are impressed upon the blank 171 as it is forced into the die cavity by advance of the nose 174. A pusher 176 ejects the finished article and also acts as a stop during the formation of the boss.

It has already been observed that the profile need not necessarily be a smooth one. Take FIG. 19, for instance. Here, the pattern 190 is planar and the workpieces 192 are kneaded into the pattern by means of one or more cylindrical formers 194, that are rolled back and forth by means such as an oscillating plate 196, which is pressed against the formers to knead them into the workpieces. The formers must, of course, be identical, so that each follows up the impression made by its predecessor, as the plate oscillates; and the amplitude of oscillation must be sufficient to ensure that the full pattern is imposed on the workpiece. The formers and the pattern 190 may be held in synchronism by means such as a rack on the pattern and pinions on the formers; and the pinion may also be engaged by a rack on the plate 196 to avoid slippage.

The workpieces may be slugs or blanks placed one each within each pattern, as is shown in FIG. 19; but the workpieces may, on the other hand, be flat bars or plates that are kneaded by the formers to impose the pattern on them. Multiple articles may be formed, joined by rupturable webs.

Of course, as in conventional forging techniques, provision must be made for ejection of the formed article from the pattern, and the article must be demouldable.

In a development of the embodiment of FIG. 19, applicable to small articles, or to articles kneaded from especially malleable material, there may not be the need for forcing the formers into kneading contact with the workpieces: it may suffice to roll the formers over the blanks to knead them into the pattern. The return motion of the formers may be idle. The formers may be in a group, of progressively increasing depth.

Figure 20:
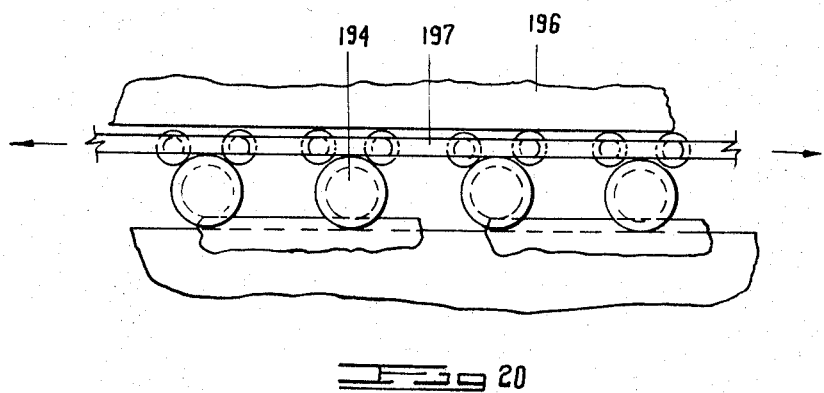

In another embodiment, shown in FIG. 20, the to-and-from motion of FIG. 19 is dispensed with and a heavy power-driven roller chain 197 is interposed under the plate 196 to obtain the re-circulating or reciprocating motion of the formers 194.

Figures 21, 22:
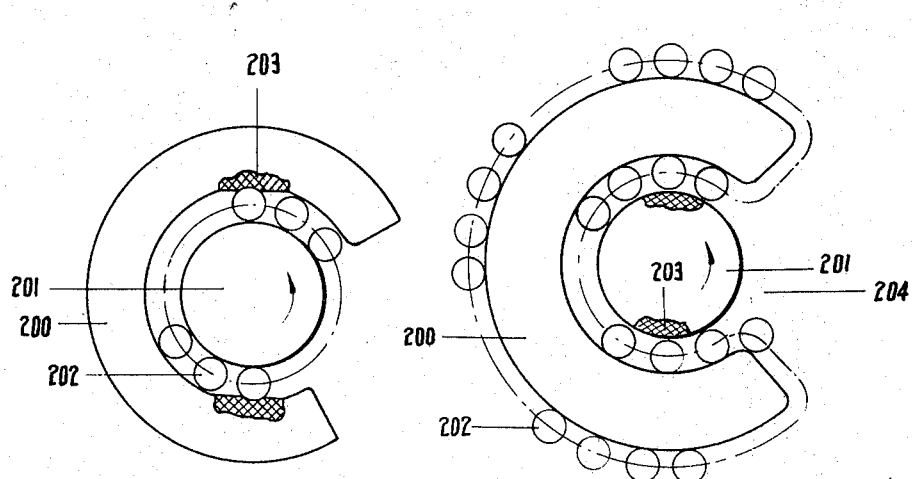

The path of the formers may be curvilinear. For instance, in FIGS. 21 and 22, a C-shaped body 200 has within its cavity a driven roller 201 that is the equivalent of the plate 196 of FIGS. 19 and 20. The formers 202 are passed through the arcuate gap between the body and the roller by rotation of the roller. Patterns 203 are provided either in the wall of the body 200 or in the periphery of the roller 201. Blanks are introduced into the patterns and are kneaded into them by the formers. In FIG. 21 there are diametrally opposed patterns and a corresponding number of groups of formers; so that the system is in balance. The patterns are in the body and the roller is stopped intermittently to withdraw the formed articles. In FIG. 22, the patterns are in the roller, and the formed articles are withdrawn as they move through the gap 204 in the body.

A development shown in FIG. 23 provides a driven roller 210 with a series of patterns 211 in its surface, and a series of formers 212, which may be profiled, rotating freely about fixed axes and held in position by one or more series of back-up rollers 213, that are rotatable about fixed axes. A strip 214 is fed between the formers and the roller. The roller 210 and/or 213 is or are driven. The strip has the patterns of the roller, and of the formers if such there be, kneaded into it during its passage through the machine. The strip emerges from the machine as a series of finished articles joined by webs. The strip may be drawn through the machine by external means.

In another development, the formers and roller are smooth and the gap through which the strip is drawn narrows, so that the finished product is a rolled strip which is of high finish and precise thickness. The machine is attractive as an alternative to the conventional strip-rolling mill by reason of its simplicity and compactness, and because of the balance of forces generated by the kneading of the strip to thin it.

Figure 43:
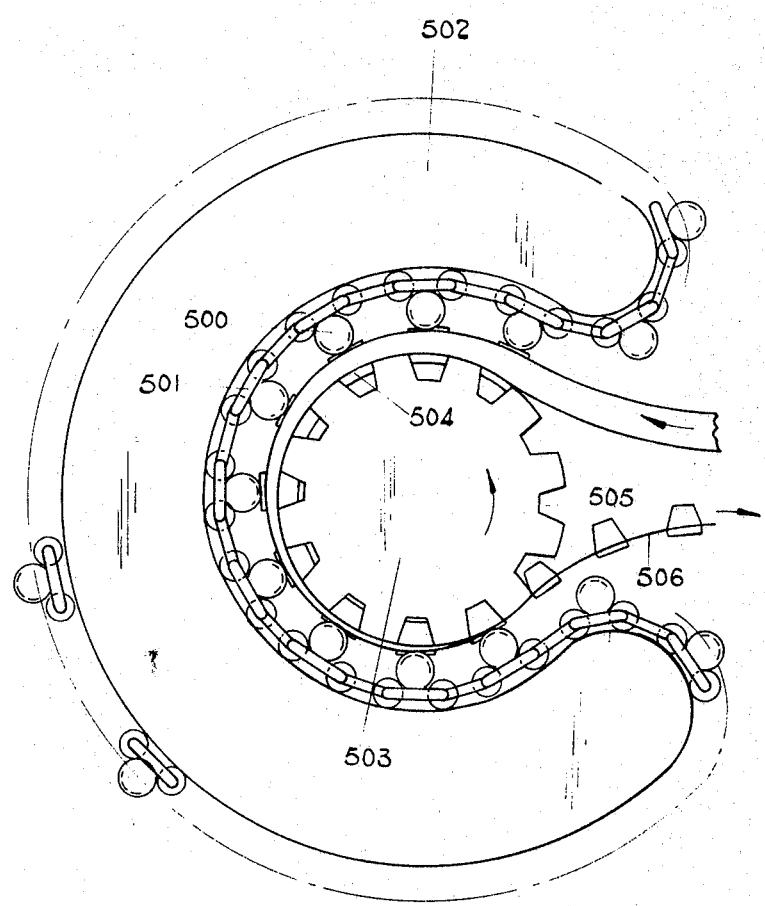

In a development of the embodiment described in the last preceding paragraph, the formers 500 (FIG. 43) are driven by a chain 501 which is guided and supported by the frame 502. The chain is itself driven in any suitable fashion. The throat between the frame and the roller 503 narrows, so that the formers, as they progress through the throat, are able to bring progressively more pressure to bear on the workpieces 504 that they knead into the patterns 505. The movement of the chain is synchronised with that of the roller.

This embodiment produces a series of finished articles joined by webs, as is seen at 506. The throughput can be very high and the feed rate is capable of infinite adjustment from zero.

In the embodiment of FIG. 24, the pattern is contained within a block 220 which is slidable on a boss 221 against the resistance of springs 222. The upper surface of the boss defines the base of the pattern, and the pattern may extend into the depth of the boss, as shown. Formers 223 are driven through a gap between the block 220 and a plate 224. A blank 227 is inserted into the pattern and the plate 224 is pressed towards the block 220 for the formers to knead the blank into the pattern; the springs 222 giving, to allow this to happen. The resulting article, such as the mushroom valve 225, is ejected by a pusher 226.

Figure 27:
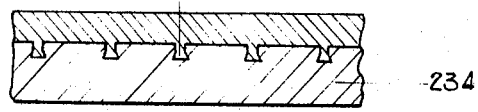

Yet another aspect of the invention renders it possible to make use of metals efficiently with special regard to their properties. As an example a stainless steel dish 230 (FIG. 25) or pot has its contours selectively reduced, as shown, by formers 231 and 232 bearing respectively within or without, the surfaces. Thereafter or while still on the same pattern, a former 233 (FIG. 26) may be brought to bear upon the base to impose a pattern on it. Subsequently, the base may be thickened by using smooth rolls and kneading a disc 234 (FIG. 27) of a highly malleable material such as copper or aluminium onto the base, to key with formations 235 formed on the base.

It is apparent that the scope of the invention is vast. It cuts down the number of components, the quantity of material used, handling charges, assembly costs, fabrication and plant for most manufacturers used today. It makes possible the production as units of such items such as the major portion of aeroplane wings, complete panels for railway trucks, the various sheet and plate steel components as used in automobiles, in one integral piece. It can provide for the inclusion of lugs, bosses, stiffeners, reinforcers, selective thickening or thinning of metal, inclusion and bonding of different metals or materials; processes that would require pressloads of hundreds of thousands of tons to be produced by conventional methods. It is doubtful whether dies or presses would be able to stand up to the task, but the kneading process embraced by the invention makes possible the production of such items with the application of relatively low forces.

Figures 28, 29:
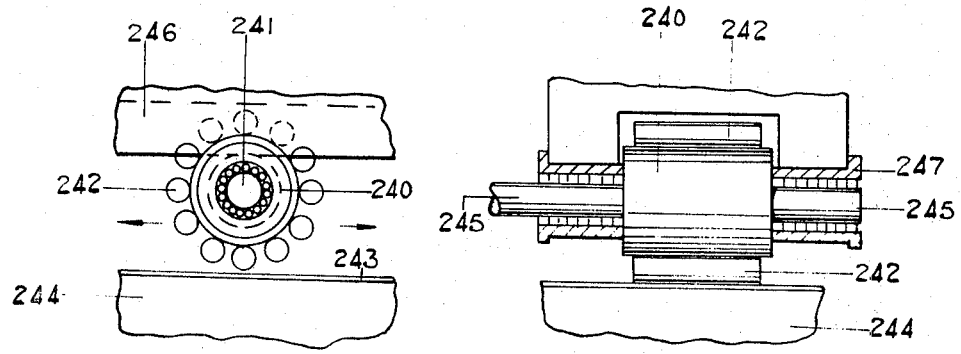

In FIGS. 28 and 29, a power-driven roller 240, driven by a shaft 241, is surrounded by planetary rollers 242, that as they rotate apply, each of the, a high-intensity transient pressure on a workpiece 243 on a pattern 244 (FIGS. 28 and 29). The ends 245 of the shaft roll upon a surface 246, through a bearing sleeve 247.

Figures 30, 31:
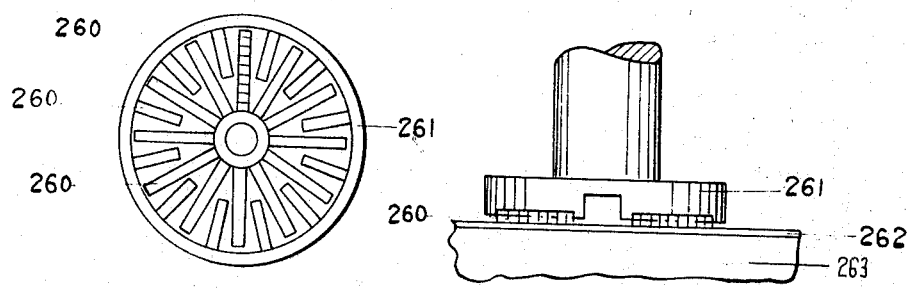

In FIGS. 30 and 31, hardened steel rollers or balls 260 are contained within a recess in a rotating holder 261 and knead a substantially flat workpiece 262 into whatever pattern is provided in a base 263.

To illustrate the utility of the technique of the invention, an automobile bumper, FIGS. 32 to 34, of general C shape, requires less than half the amount of metal to achieve its purpose if produced by the methods of the invention. It is strengthened by ribs 290, 291 and 292, (FIGS. 33 and 34). The recesses 293 merely serve an aesthetic purpose, in that the floors provide the continuous outer face 294 of the bumper. Moreover the need for polishing is removed as a burnishing effect is produced, and because of its light weight the economic use of stainless steel is practicable. The machine of FIGS. 28 and 29 may be used to follow a curvilinear path corresponding to the shape of the component, as shown in FIG. 35. The workpiece 300 is placed on a pattern 301, the re-entrant portion 302 being sprung off for withdrawal from the pattern 301.

It would not be possible to produce the cellular panel of FIGS. 37 and 38 with its selectively placed ribs 310, 311 by a rolling mill whose products are necessarily of uniform cross-section, yet by the use of the techniques of the invention it could be "tailor-made" to meet exact requirements such as the inclusion of lugs, the folding over, around and under, of the outside rim for stiffening purposes, and the inclusion of a plastic material kneaded into the recesses 312 in the back face of the panel, such as is required for noise and heat insulation purposes, or even the further kneading in of different metals or material for other purposes.

Machines operating on the principle of that illustrated in FIG. 28 and FIG. 29 can find application in the compaction of bodies such as moulded metals or concrete. In FIG. 39, such a machine, with a rotating roller 320 having planetary formers 321 arranged around it bears down on a body of concrete 323 in a green state. The machine is pressed down on to the concrete body and is moved to and fro across the body.

The roller 320 may be rotated at any speed relatively to the rate of translation of the machine.

The formers, as they make contact with the body 323, knead or pummel it progressively along its surface. The result is that the force applied to the body over a small area generates very high pressures, although the force is itself not of great magnitude and if applied over all but a small surface area of the body would produce no significant effect. The progressive production of the high pressures along the surface causes high compaction of the body and densifies it to better effect than is possible by vibration or tamping.

The body may, of course, be of cast metal, as in FIG. 40, which is still partially molten but has a solidified skin, which has been preformed by chill-block 332, of sufficient thickness to sustain the hammering of the formers which eliminates the pipe formation 333 and allows the impurities to exude.

Figure 41:
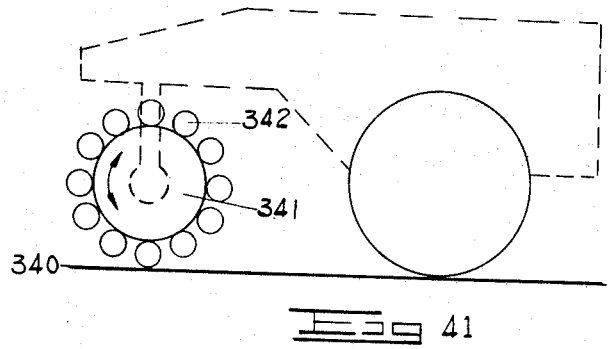

Another application is seen in FIG. 41, where the body 340 is a road. The machine 341 traverses the road and the formers 342 apply localised high pressure to it to compact it. It is to be noted that the speed and direction of the planetary rollers are independent of the speed of the vehicle. When it is required to traverse very soft terrain, the planetary rollers may, for instance, be locked to the back-up roller.

Figure 42:
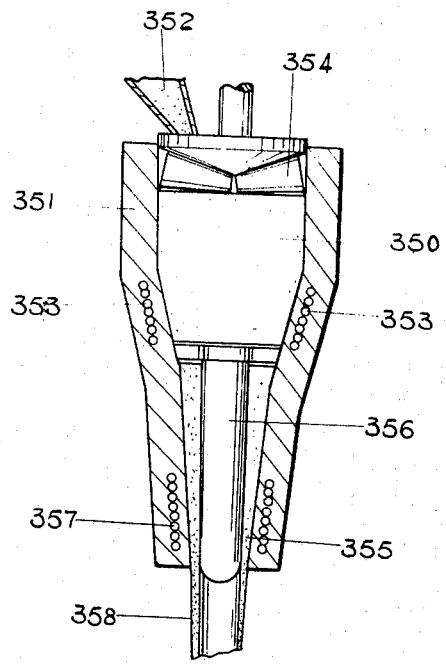

In FIG. 42, a mass of discrete particles 350 is introduced into a pestle 351, through a feeder 352. The mass is heated as by induction coils 353 and pressure is applied to the surface of the mass progressively by a device 354 such as that of FIG. 17. The material is extruded through an annular orifice 355 between the tapering wall of the pestle and a central core 356, to form a continuous pipe 358. Cooling fluid is circulated around the orifice through coils 357. Without the core, it would be extruded as a bar or wire.

Finally, a few words may be said about the nature of the materials which are treated by the techniques of the invention. The techniques apply to most materials other than refractories which tend to crack under pressure. The particular material to be used must be selected for its characteristics.

Different materials differ in their ability to retain the shape imposed on them. (For example soft rubber has no retaining property at all.) Steel in a hot state is very ductile whereas in the cold state it has slight elasticity which allows for a small springback after compacting. Aggregates or mixtures of other materials also have different properties, for example sharp needle-like crushed rock is more capable of retaining a degree of compaction than, say, smooth circular pellets or smooth metallic balls. Alloys of metals have greater resistance to deformation than pure metals, because once slippage begins between the crystals or grains they tend to lock more tightly and resist flow more than pure metals. The invention is well capable of dealing with such materials because of the application of high pressures over small areas, where conventional forging or extruding techniques, especially in the cold, would be impossible.

I claim:

1. Apparatus for applying a high pressure to a circular body of a material which is capable of plastic deformation when subject to such pressure, comprising at least one forming roller which rolls over at least one surface of the body; backing means for the roller having a continuous rolling surface over which the roller can roll; and die means having a circular recess therein, the recess having a bottom wall supporting the body over a surface opposite the surface over which the roller rolls, and the recess having a radially outer side wall supporting the body over a radially outer surface of the body, the axis of the roller being perpendicular to the axis of said recess as viewed in the direction of the axis of said recess.

References Cited
UNITED STATES PATENTS

| | | | |
|---|---|---|---|
| 3,339,392 | 9/1967 | Buckwalter et al. | 72—166 |
| 1,744,549 | 1/1930 | Hopkins | 72—110 |
| 1,781,140 | 11/1930 | Taylor | 72—87 |
| 2,049,202 | 7/1936 | Edelmeier | 72—87 |
| 2,610,532 | 9/1952 | Heppenstall | 72—111 |
| 3,370,447 | 2/1968 | Skinner et al. | 72—72 |
| 259,178 | 6/1882 | Laurent | 72—86 |
| 1,698,373 | 1/1929 | Nelson | 72—83 X |
| 1,897,645 | 2/1933 | Swanson | 72—109 |
| 2,921,549 | 1/1960 | Schwenk | 72—83 |

MILTON S. MEHR, Primary Examiner

U.S. Cl. X.R.

72—83, 86, 109, 110